(12) United States Patent
Ng

(10) Patent No.: US 6,877,855 B2
(45) Date of Patent: Apr. 12, 2005

(54) SPECTACLES WITH PERIPHERAL LENS SUPPORT

(76) Inventor: Dave Ng, 11 Milford Lane, Unionville, Ontario (CA), L3R 0S1

(*) Notice: Subject to any disclaimer, the term of this patent is extended or adjusted under 35 U.S.C. 154(b) by 0 days.

(21) Appl. No.: 10/614,770

(22) Filed: Jul. 8, 2003

(65) Prior Publication Data

US 2005/0007545 A1 Jan. 13, 2005

(51) Int. Cl.[7] .................................................. G02C 1/02
(52) U.S. Cl. ........................ 351/110; 351/140; 351/154
(58) Field of Search ................................ 351/110, 140, 351/154

(56) References Cited

U.S. PATENT DOCUMENTS 2,588,505 A    3/1952 Ellis
3,846,017 A    11/1974 Ferrell
4,550,989 A  * 11/1985 Hafner ........................ 351/103
4,692,001 A    9/1987 Anger
5,357,292 A    10/1994 Wiedner
5,646,706 A  * 7/1997 Izumitani .................... 351/110
5,684,558 A    11/1997 Hamamoto
RE37,461 E    12/2001 Izumitami
6,705,723 B1 * 3/2004 Lavie ........................ 351/110

FOREIGN PATENT DOCUMENTS

EP              0796454 B1    5/1995
JP              4-63419       5/1992
WO              WO 96/12983   5/1996

* cited by examiner

*Primary Examiner*—Huy Mai
(74) *Attorney, Agent, or Firm*—Seyfarth Shaw LLP

(57) ABSTRACT

A spectacle apparatus is provided wherein the bridge and sidearms are attached to the lenses of the apparatus using pin-like projections received in blind holes formed in the edge surface of the lenses and a support line inserted in a groove formed in the edge surface of each lens.

27 Claims, 18 Drawing Sheets

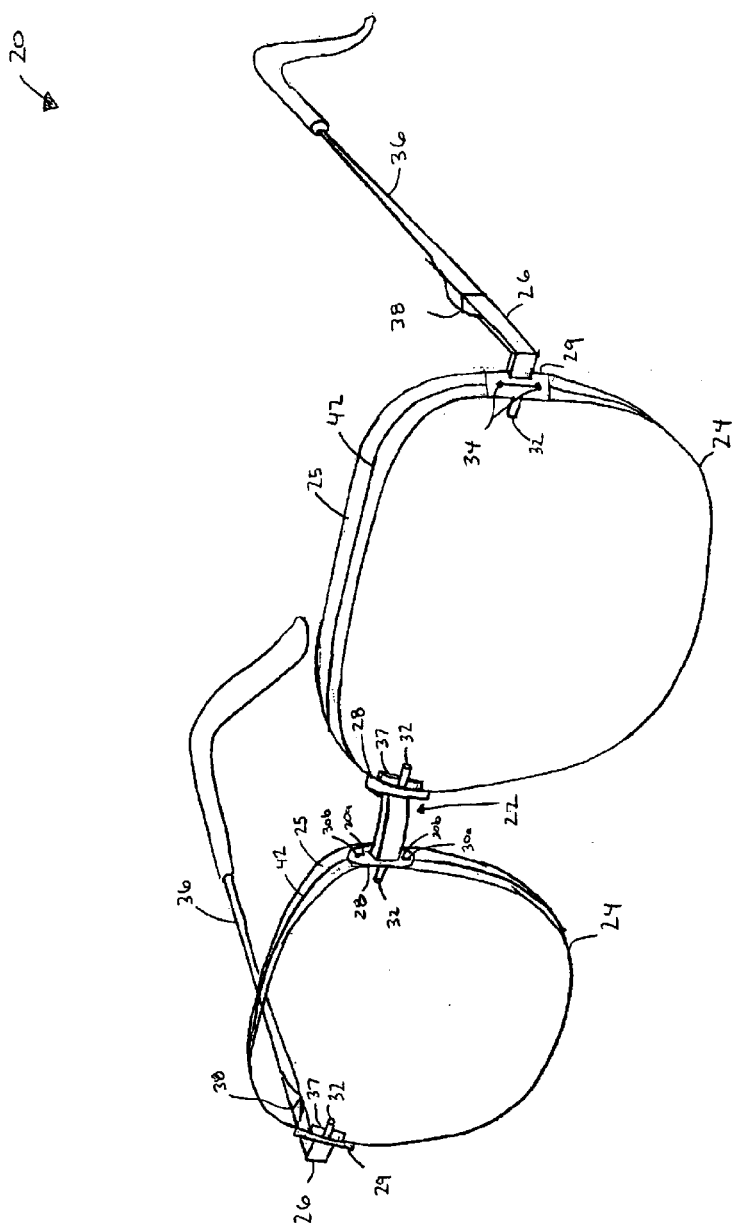

SPECTACLES WITH PERIPHERAL LENS SUPPORT

FIELD OF THE INVENTION

The present invention relates to spectacles, and more particularly to spectacles with peripheral lens support.

BACKGROUND OF THE INVENTION

Eyeglasses or spectacles are manufactured in a wide variety of shapes and configurations tailored to different needs and preferences of the eyeglasses wearer. Rimless spectacles provide many advantages over traditional framed spectacles such as an improved, less obstructed field of view and lightness in weight. Many different styles of spectacles are known in the art.

U.S. Pat. No. 5,684,588 to Hamamoto discloses semi-rimless spectacles comprising a pair of lenses each having an upper and lower edge portion, the upper edge portion of each lens being fitted in a section of metal frame, and the lower edge portion having a groove cut along its edge surface. A nylon thread is laid along the groove in the lower edge portion of each lens, and the opposite ends of the thread are fastened to the upper metal frame whereby the lenses are suspended. One disadvantage of rimless spectacles of this type is that the metal frame is visible on the wearer of the spectacles, even a significant distance. Other disadvantages are that the metal frame creates an obstruction in the field of view of the wearer, and increases the overall weight of the spectacles. For many eyeglass wearers, it is desirable to have spectacles that have less visible frames and which provide a less obscured view.

A type of rimless spectacles uses lenses which are supported by means of screws fitted into holes formed through the surface of each lens. Small screw holes, typically 1.4 mm in diameter, are bored through portions of each lens close to its respective hinge edges where the sidearms are attached. Screws are threaded into the holes to attach the lenses to other structural components of the spectacles such as the sidearms and bridge. Examples of rimless spectacles of this type can be found in Japanese Utility Model Publication No. 4-63419 and U.S. Pat. No. 4,692,001 to Anger. A disadvantage of spectacles of this type is that during the formation of the exit hole for the screws, the lens may be chipped. Also, the act of threading a screw into the bored screw holes may crack the lens surface. In some applications, screw hole cracking is minimized by boring screw holes at a distance from the edge of the lens. However, this approach obstructs the field of view of the wearer of the spectacles by placing screws and nuts and/or other spectacle components further away from the edge of the lens and more directly in the wearer's field of view. Furthermore, because screws, nuts and/or other spectacle components attached to the lenses protrude from the surfaces of the lenses, they form an obstacle during cleaning of the lenses.

U.S. Pat. No. RE37,461 E to Izumitami discloses a frame for rimless spectacles that does not use projections from the surface of the lens. Blind holes are bored in the nose-side and temple-side edge portions of each spectacle lens. Pin-like projections are attached to the sidearm and bridge, and are inserted into the corresponding blind holes in the lens and are fixed with an adhesive. A disadvantage of rimless spectacles of this type is that the pins carry the majority of the load created by the lenses and are responsible for the strength of the connection of the lenses to the other spectacle components. To support the spectacles, the pins are longer and larger in diameter than is aesthetically desirable by many eyeglass wearers. To prevent rotational movement, at least two pins must be used at each attachment point. The size and number of pins required by spectacles of this type also create an obstruction in the wearer's field of view. Furthermore, the pins must be fixed within the corresponding blind holes using an adhesive. The use of an adhesive complicates the manufacturing process of the spectacles and may increase the obstruction in the wearer's field of view caused by the pins. Thus, it is desirable to have rimless spectacles that are more aesthetically pleasing and which have a less obscured field of view.

SUMMARY OF THE INVENTION

The present invention is a spectacle apparatus that uses a support line to reduce the size and number of pins or projections required to secure the spectacle lenses, providing spectacles that are more aesthetically pleasing and which have a less obscured field of view.

In accordance with one aspect of the present invention, there is provided an apparatus for holding a spectacle lens, comprising: an elongate bridge defining a bridge-side hole at each end, the elongate bridge having a first projection at each end, each first projection being adapted for insertion in a blind hole in the edge surface of the spectacle lens.

In accordance with another aspect of the present invention, there is provided an apparatus for holding a spectacle lens, comprising: an elongate bridge having a first and second end, and defining a bridge-side hole in each of the first and second ends; a first fixing member attached to the elongate bridge; and a support line inserted in a groove formed in the edge surface of the spectacle lens and received in at least one bridge-side hole.

In accordance with a further aspect of the present invention, there is provided a spectacle apparatus, comprising: a pair of lenses each having an edge surface, each lens defining a groove in the edge surface; an elongate bridge defining a bridge-side hole at each end, the elongate bridge having a first projection at each end, each first projection being adapted for insertion in a blind hole in the edge surface of one of the lenses; a pair of contact plates, each contact plate defining an arm-side hole adapted for receiving the support line, each contact plate having a second projection at one side, each second projection being adapted for insertion in a blind hole in the edge surface of one of the lenses; and a support line inserted in at least one groove of at least one spectacle lens, and received in at least one bridge-side hole and at least one arm-side hole.

In accordance with yet a further aspect of the present invention, there is provided a method for holding a spectacle lens in a spectacle apparatus, the spectacle apparatus including an elongate bridge defining a bridge-side hole at each end, the elongate bridge having a first projection at each end, the method comprising the steps of: inserting the first projection into a blind hole formed in the edge surface of the spectacle lens; and inserting a support line in at least one bridge-side hole.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Reference will now be made to the accompanying drawings which show, by way of example, preferred embodiments of the present invention, and in which:

FIG. 1 is a perspective view of one embodiment of a spectacle apparatus according to the present invention;

Figure 2A:
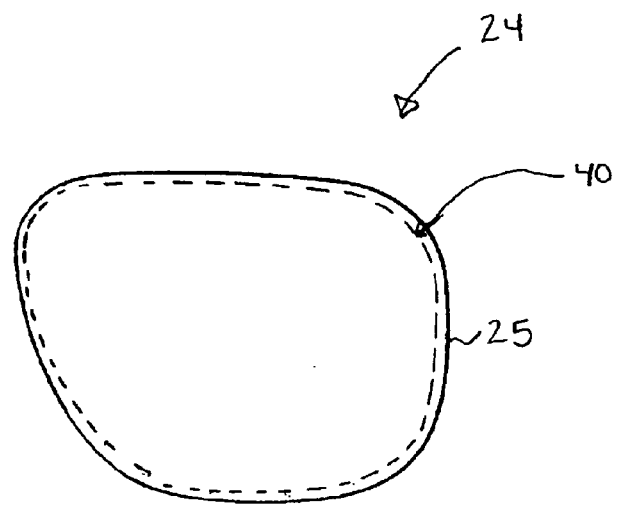
FIG. 2A is a front view of a lens in the spectacle apparatus of FIG. 1.
Figure 2B:
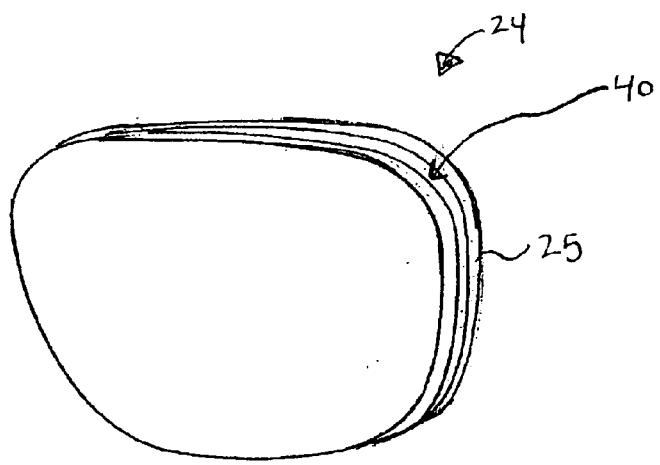
FIG. 2B is a perspective view of the lens of FIG. 2A.

Similar references are used in different figures to denote similar components.

DETAILED DESCRIPTION

The present inventor has created an apparatus for holding a lens. The apparatus utilizes, at an attachment point, a projection as a primary attachment between the lens and a bridge or arm, and a line which can prevent rotational movement between the lens and bridge or arm. The line can also reduce or obviate the need to use adhesives, screws, or other means to fix the pin to the lens.

Referring now to FIG. 1, a spectacle apparatus in accordance with one embodiment of the present invention is indicated generally at 20. The spectacle apparatus 20 comprises a bridge 22, lenses 24 having an edge surface 25, and arm ends including an end piece 26 and contact plate 29. Bridge 22 includes a bridge member 27 spanning bridge plates 28. Bridge plates 28 define bridge-side holes 30. Projections 32 and groove plates 37 are attached to bridge plates 28 and contact plates 29. Nose pieces (not shown) may also be attached to the bridge 22. Contact plates 29 define arm-side holes 34. Preferably, the bridge-side holes 30 and arm-side holes 34 are through holes, however if desired blind holes may be used with modifications to the method of assembly described below. The holes 30 and holes 34 be may be the same or different. Sidearms 36 are attached to the end pieces 26 using a hinge 38 or other suitable fastener for providing pivotable movement of sidearms 36 between an extended wearable position and retracted unwearable position. Grooves 40 are defined in the edge surface 25 of each of the lenses 24. Support lines 42 are inserted in grooves 40 and received in holes 30 and 34 corresponding to each lens 24.

The material of support line 42 is selectable from a variety of materials including synthetic polymer fibers and flexible metal wire. The selectablity of the material of support line 42 allows the eyeglass wearer to select a support line that suits his or her specific needs and/or preferences. Preferably, the support line 42 is a fishing line, for example a fishing line selected from the Stren™ line of the products manufactured by Remington Arms Company, Inc. (USA). The use of fishing line allows the eyeglass wearer to choose from a variety of transparent or low-visibility, single-coloured and multi-coloured materials in order to better select the desired look of the spectacle apparatus, customized to the eyeglass wearer's individual preferences. Other types of fiber, wire, cable or line, for example suitable polymer and metal lines, may be used as a support line if desired. A typical diameter of the support line 42 is 0.5 mm to 0.6 mm, however a support line with a larger or smaller diameter may be used.

Referring now to FIGS. 2A to 2D, the lenses 24 will be described in more detail. The lenses 24 are made of glass, plastic or other suitable eyeglass material. Examples of plastic lenses include allyl lenses made of diethylene glycol allyl carbonate (CR-39) or its mixed copolymers, polycarbonate lenses, acrylic lenses, bisphenol A derivative lenses, and polyurethane lenses. The lenses 24 may be corrective lenses, cosmetic lenses, tinted or clear lenses, or adaptive lenses that darken or lighten according to the surrounding light conditions such as Transitions™ lenses manufactured by Transitions Optical, Inc. (USA). The thickness of the lens may vary but must be at least 2 mm. The size and shape of the lenses 24 is selected according to the specific needs and/or preferences of the eyeglasses wearer. Grooves 40 are cut, drilled, machined or otherwise formed in the edge surface 25 of the lenses 24. Grooves 40 preferably encircle the entire edge surface 25 of each lens 24. The width and depth of each groove 40 depends on the support line selected, however the groove dimensions must be sufficient to at least partially receive the support line 42.

Figure 2C:
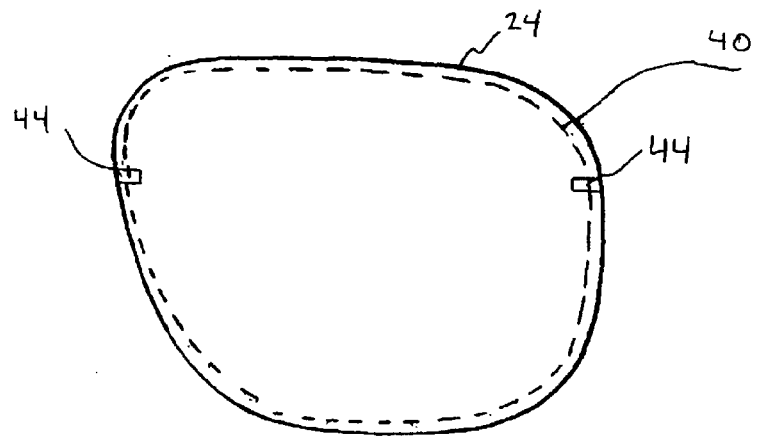
FIG. 2C is an enlarged front view of the lens of FIG. 2A with blind holes formed therein.
Figure 2D:
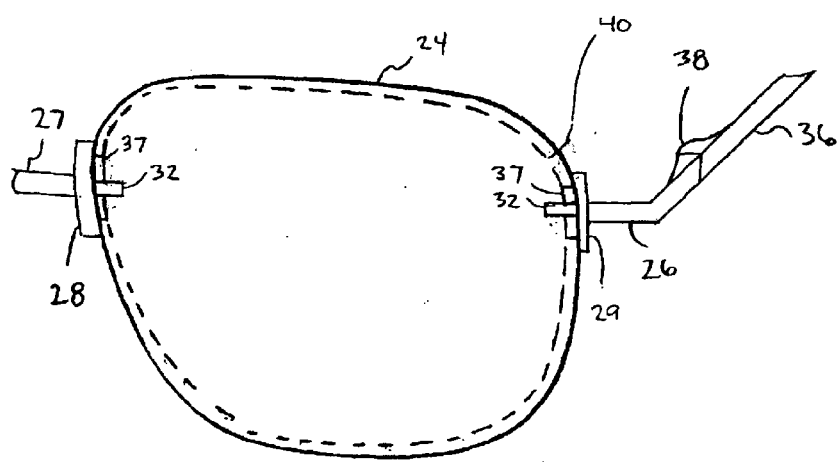
FIG. 2D is a front view of the lens of FIG. 2C with the contact plates and bridge attached.

Blind holes 44 are drilled, bored or otherwise formed in the edge surface 25 of each of the lenses 24 (FIG. 2C). The location of the blind holes 44 differs depending on the lens shape, and the shape of the bridge 22 and contact plates 29 selected. At least one blind hole 44 is required on each of the bridge-side and arm-side of the lenses 24. The length and diameter of blind holes 44 must be sufficient to receive projections 32 (FIG. 2D). Preferably, the blind holes are no larger than is required to receive projections 32 to minimize any obstruction in the eyeglass wearer's field of view.

Figure 11:
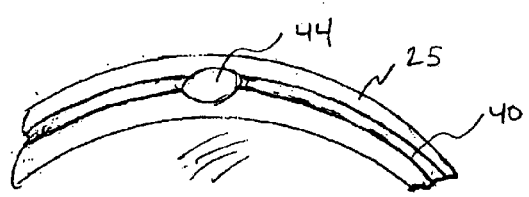
FIG. 11 is a partial perspective view of a blind hole in the lens of FIG. 1 formed at an angle to the edge surface, the edge surface being curved and having a groove defined therein.

Referring now to FIGS. 9A to 11, the blind holes will be described in more detail. The blind holes 44 may be drilled an angle to the edge surface 25 of the lenses 24 (FIG. 9A), for example, parallel to the lens surface, or perpendicular to the edge surface 25 (FIG. 9B). Preferably, the blind holes 44 are formed coplanar with groove 40 in the edge surface 25. Depending on the lens shape and any desired shaping of the edge surface 25, for example, to provide better contact between the lenses 24 and the bridge plates 28 and/or contact plates 29, the edge surface 25 may be flat (FIG. 10) or curved (FIG. 11).

Figure 4:
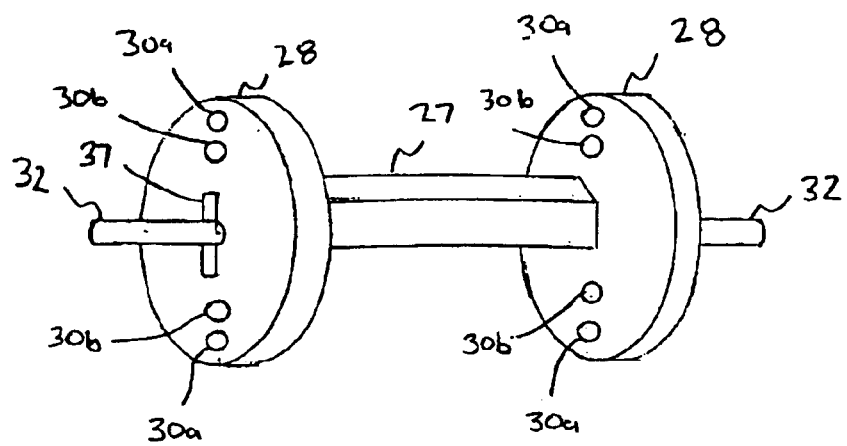
FIG. 4 is a perspective view of a bridge in the spectacle apparatus of FIG. 1.
Figure 5:
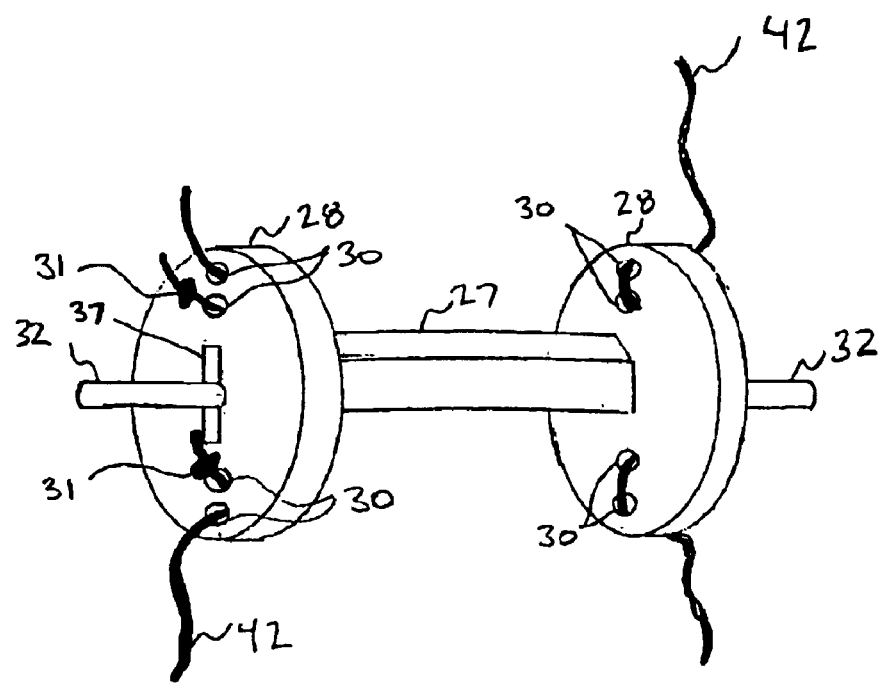
FIG. 5 is a perspective view of the bridge of FIG. 4 with a support line received in the bridge side holes and fixed using a knot.
Figure 6:
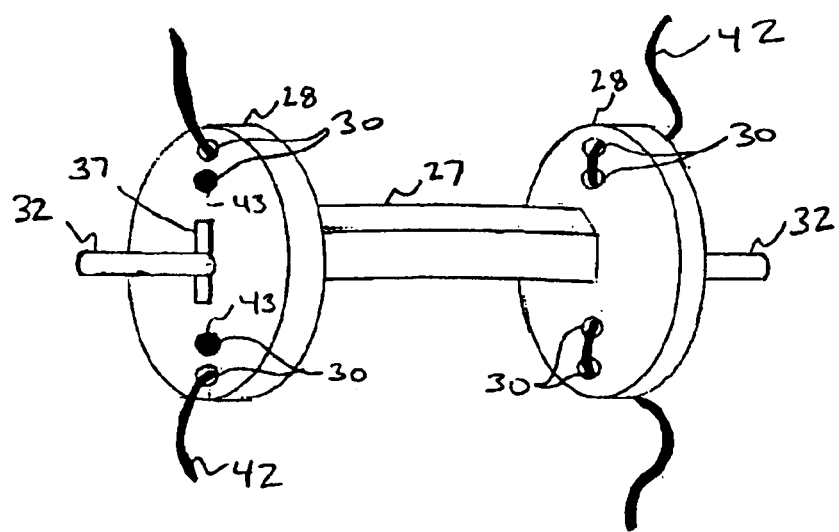
FIG. 6 is a perspective view of the bridge of FIG. 4 with a support line received in the bridge side holes and fixed using an interference fit.

Referring now to FIGS. 4 to 6, the bridge 22 will be described in more detail. The material of the bridge 22 may be metal, plastic or other suitable material. Bridge-side holes 30 are used to receive and/or fix the support line 42. In this embodiment, the support line 42 is fixed in the bridge 22, however the support line may be fixed in the contact plates 29. Bridge-side holes 30 are preferably defined in pairs, two being in the upper portion of the bridge plate 28 above the projection 32, and two in the lower portion of the bridge plate 28 below the projection 32. Greater or fewer bridge-side holes 30 may be used. Other locations of the bridge-side holes 30 are also possible. As shown in FIG. 4, the bridge-side holes nearest the outer edge of the bridge plate 28 are indicated individually by reference 30a, and the bridge-side holes nearest the projection 32 are indicated individually by reference 30b.

Figure 3A:
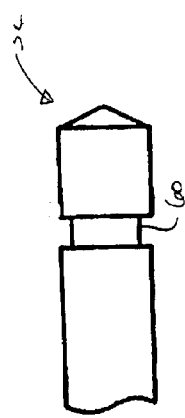
FIG. 3A is a side view of a first irregularly shaped projection.
Figure 3B:
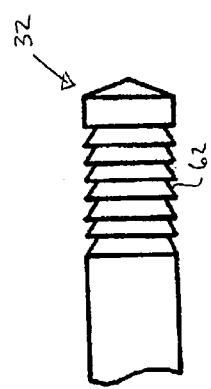
FIG. 3B is a side view of a second irregularly shaped projection.
Figure 3C:
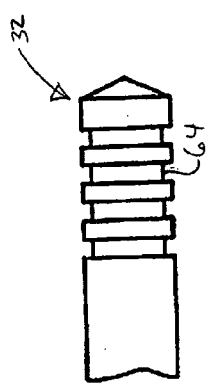
FIG. 3C is a side view of a third irregularly shaped projection.

The shape and size of the bridge member 27 and the bridge plates 28 may be selected according to the specific needs and/or preferences of the eyeglass wearer. The shape of the projections 32 may also vary. In this embodiment, the projections 32 are cylindrical or pin-like. Other shapes of the projections 32 are possible. The projections 32 may be integrally formed with the bridge plates 28 and contact plates 29. Referring now to FIGS. 3A to 3C, some of the other possible configurations of the projections 32 will be described. In FIG. 3A, the projection 32 has a single annular groove 60 cut in the surface of the projection 32. In FIG. 3B, the projection 32 has a series of angled annular grooves 62 cut in the surface of the projection 32. In FIG. 3C, the projection 32 has a series of flat annular grooves 64 cut in the surface of the projection 32.

Referring now to FIG. 5, the bridge 22 is shown with support line 42 received in the bridge-side holes 30 and fixed using a knot formed of the support line 42. During the fixation of a lens 24 to bridge 22, the support line 42 is introduced into the bridge-side holes 30 nearest the outer edge of the corresponding bridge plate 28. The support line 42 enters the bridge plate 28 on the lens-side and is drawn through to the bridge-side of plate 28. The support line 42 is then introduced into the second hole 30 of each pair of holes 30 nearest the projection 32. The support line 42 is then drawn back through the second hole 30 to the lens-side of plate 28. The support line 42 is then tensioned to a desired line tension and fixed by forming a very small knot 31 in the support line 42 on the lens-side of bridge side plate 28. Any excess support line may then be cut away. The line tension may vary but must be at least sufficient to support the lenses 24 within the spectacle apparatus 20. If desired, it is possible to reverse the order in which the support line 42 is received in and fixed within the bridge-side holes 30.

Referring now to FIG. 6, the bridge 22 is shown with support line 42 received in the bridge-side holes 30 and fixed using an interference fit. In this embodiment, the support line 42 has an enlarged section or bulb 43 at or near its respective ends. Bulb 43 may be integrally formed with support line 42 or may be added to the respective ends of the support line selected. Preferably, bulb 43 is made of Polyflex™ (Hyundai Optical Co., Inchon City, Korea) or memory plastic. Memory plastic and Polyflex™ are lightweight plastics that can be bent or stretched without losing their original shape. Polyflex™ is particularly resilient in this regard. Bulb 43 is configured such that it is greater in diameter than hole 30 when not deformed. The use of such materials also allows for the insertion of support line 42 and bulb 43 through holes 30, by temporary deformation of bulb 43.

During the fixation of a lens 24 to bridge 22, bulb 43 is temporarily deformed and support line 42 is fitted in the bridge plate 28 as described above with reference to FIG. 5. While the support line 42 is maintained at the desired line tension, the bulb 43 reestablishes, by plastic memory, its original diameter, thus securing lenses 24 to the bridge 22 in an interference fit. The security of attachment may be increased by treating bulb 43 with glue or other fixative after assembly, or by treating bulb 43 to compression forces which are great enough to permanently deform bulb 43, partially spreading it against the lens-side surface of bridge plate 28 immediately around hole 30.

In another embodiment, the support line 42 may be secured in the bridge-side holes 30 using an adhesive. The support line 42 is fitted in the bridge plate 28 as described above with reference to FIG. 5, however prior to assembly, an adhesive is introduced into the second hole 30 of each pair of holes 30 in the bridge plate 28. During fixation, the support line 42 is maintained at the desired line tension until the adhesive sets. Any excess support line 42 may then be cut away.

Figure 7A:
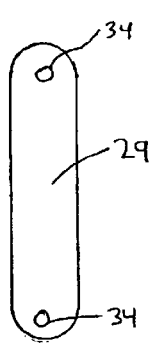
FIG. 7A is a front view of an end piece in the spectacle apparatus of FIG. 1.
Figure 7B:
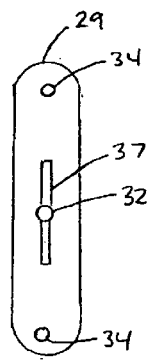
FIG. 7B is a rear view of the end piece of FIG. 7A.
Figure 7C:
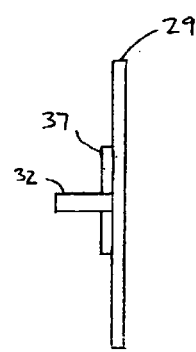
FIG. 7C is a side view of the end piece of FIG. 7A.

Referring now to FIGS. 7A to 7C, a contact plate 29 will be described in more detail. Preferably, the contact plate 29 is elongate with a width of 2 mm and a length of 8.5 mm. Other shapes and dimensions of the contact plate 29 may be used if desired. The arm-side holes 34 are typically located near the respective ends of the contact plate 29. Projection 32 is preferably pin shaped and located in the centre of the contact plate 29. If desired, the projection 32 may be located off centre. The projection 32 may be 1 mm in diameter and 1.5 mm in length, however projections that are larger or smaller may be used. Suitable alternatives include pins having a diameter of 0.5 to 1.5 mm and a length between 1.5 and 4 mm. The groove plates 37 run parallel to the major axis of the contact plate 29. The groove plates 37 may be 0.5 mm in width and extend 1.5 mm on each side of the projection 32. The groove plates 37 are received in the grooves 40 when the spectacle apparatus 20 is assembled. Other shapes and dimensions of the groove plates 37 may be used so long as the groove plates may be received in the grooves 40.

Figure 8A:
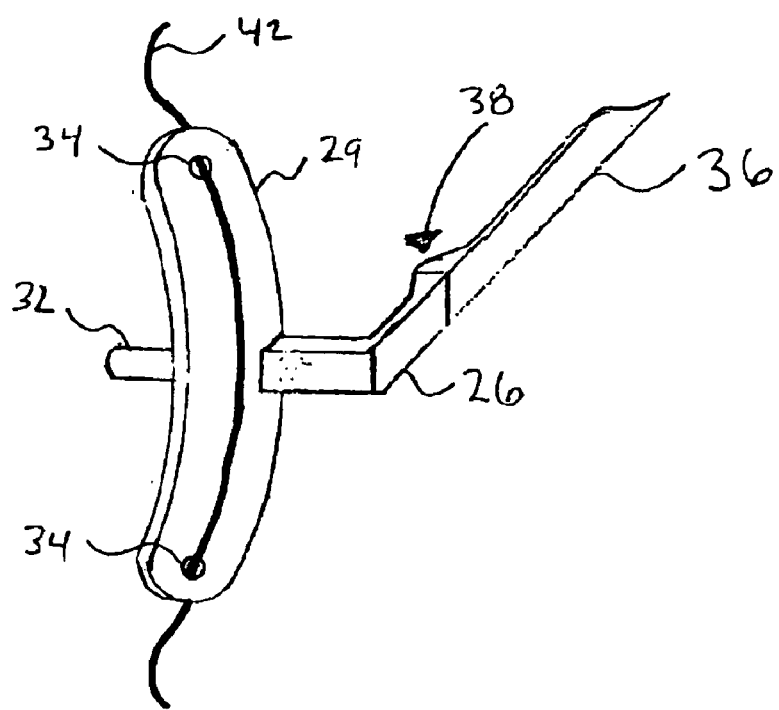
FIG. 8A is a perspective view of the end piece of FIG. 7A with a support line received therein and a sidearm attached.
Figure 8B:
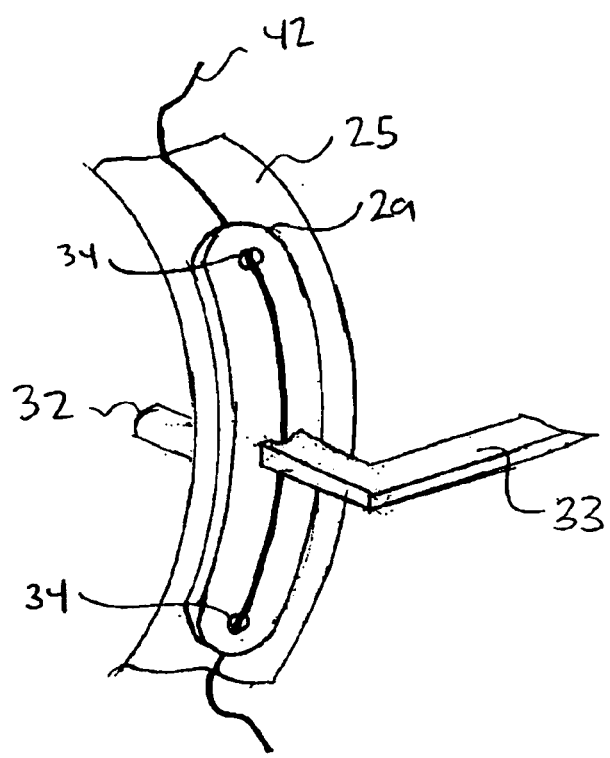
FIG. 8B is a perspective view of an end piece of another embodiment of the spectacle apparatus according to the present invention.
Figure 9A:
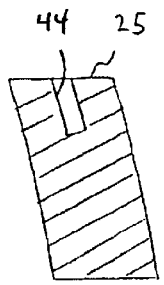
FIG. 9A is a partial side view of a blind hole in the lens of FIG. 1 formed at an angle to the edge surface.
Figure 9B:
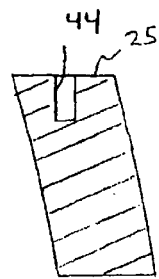
FIG. 9B is a partial side view of a blind hole in the lens of FIG. 1 formed perpendicular to the edge surface.
Figure 10:
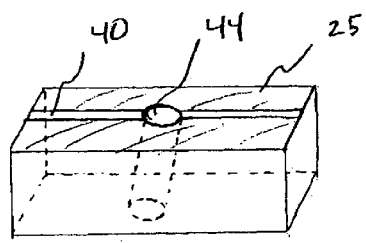
FIG. 10 is a partial perspective view of a blind hole in the lens of FIG. 1 formed at an angle to the edge surface, the edge surface being flat and having a groove defined therein.

FIGS. 8A and BB illustrate a contact plate 29 with end piece 26 and sidearm 36 attached. During assembly of the spectacle apparatus 20, the support line 42 is received in arm-side holes 34 and is held tightly in the shown position on the contact plate 29 by line tension. The end piece 26 may be attached to contact plate 29 to one side of where the support line 42 is located (shown on the front, right side). In an alternative embodiment, end piece 33 attached to contact plate 29 defines a channel allowing the end piece 33 to be attached overtop of support line 42 (FIG. 8B). The channel defined by end piece 33 allows support line 42 to be passed easily therethrough during the assembly of the spectacle apparatus 20. The end piece 26 or 33 may be positioned near the projection 32 or near one of the ends of the contact plate 29. The end pieces 26 or 33 may be integrally formed with the contact plate 29.

One method of assembling the spectacle apparatus 20 will now be described. A support line 42 is first introduced into an arm-side hole 34 in a contact plate 29 corresponding to one of the lenses 24. The support line 42 enters the contact plate 29 on the lens-side and is drawn through to the arm-side of contact plate 29. The support line 42 is then introduced into the other arm-side hole 34 and is drawn back to the lens-side of contact plate 29. For the preceding steps in the assembly of the spectacle apparatus 20, the contact plate 29 preferably has end piece 26 or 33 and sidearms 36 already attached. In the next step, the contact plate 29, with support line 42 received therein, is removably attached to the lens 24 by insertion of projection 32 into the corresponding blind hole 44, and the insertion of the groove plate 37 into the corresponding groove 40. If desired, the security of attachment of the projection 32 may be increased treating the projection 32 or blind hole 44 with an adhesive. The support line 42 is then inserted into the groove 40 of the lens 24. If desired, the support line 42 may be secured in the groove 40 using an adhesive. Upon assembly, support line 42 reduces pivotable movement of the apparatus about the projections 32, and provides further security and strength of the apparatus 20 by holding spectacle components under tension. For each of its respective ends, the support line 42 is introduced into the bridge-side hole 30a nearest the outer edge of the bridge plate 28 corresponding to the lens 24 (see FIG. 4). The support line 42 enters the bridge plate 28 on the lens-side and is drawn through to the bridge-side of plate 28. The support line 42 is then introduced into the bridge-side hole 30b nearest the projection 32. The support line 42 is then drawn through the bridge-side hole 30b to the lens-side of plate 28. The support line 42 is then tensioned to a desired line tension and fixed by forming a very small knot 31 in the support line 42 on the lens-side of bridge side plate 28. Any excess support line may then be cut away. The process is then repeated for the second lens 24. A similar method is employed when the support line 42 is fixing using an interference fit or an adhesive, and when the support line 42 is fixed in the contact plates 29.

Figure 12A:
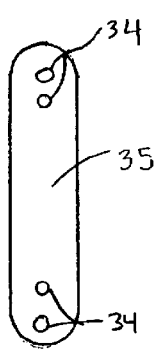
FIG. 12A is a front view of an end piece of an alterative embodiment of the spectacle apparatus according to the present invention.
Figure 12B:
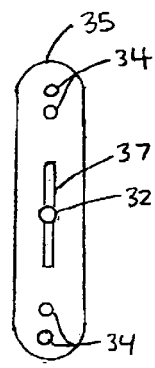
FIG. 12B is rear view of the end piece of FIG. 12A.
Figure 12C:
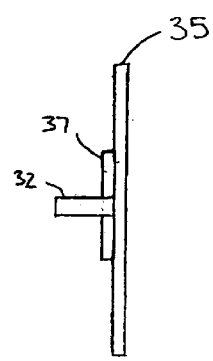
FIG. 12C is a side view of the end piece of FIG. 12A.
Figure 13:
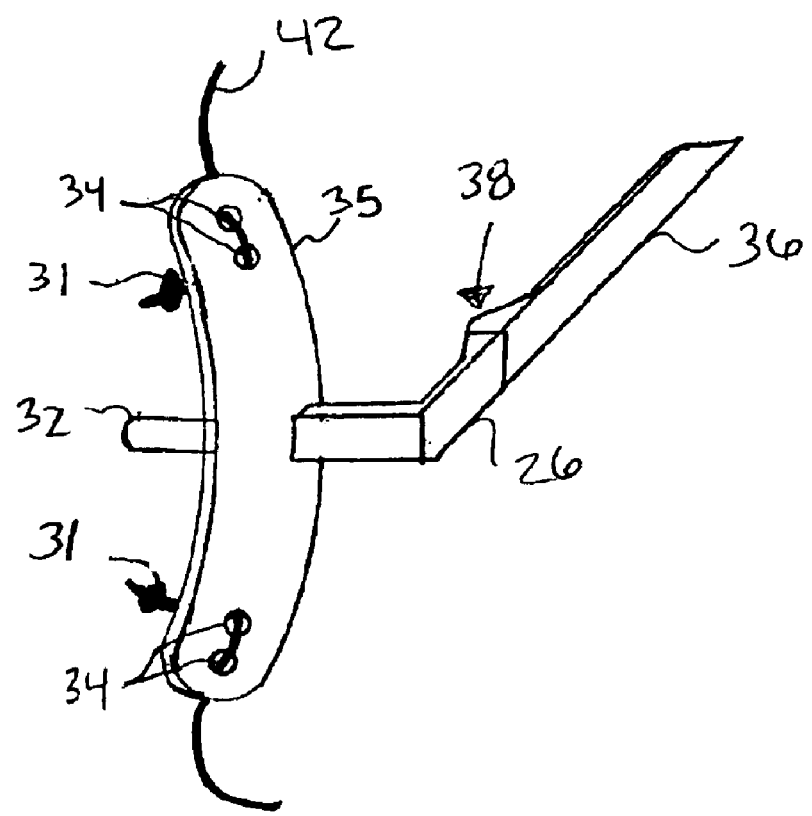
FIG. 13 is a perspective view of the end piece of FIG. 12A with a support line received therein and fixed using a knot, and having a sidearm attached.

Referring now to FIGS. 12A to 12C, a contact plate 35 of an alternative embodiment of the spectacle apparatus according to the present invention will be described. The spectacle apparatus of this alternative embodiment is substantially similar to the spectacle apparatus 20, except that the support line 42 is fixed in the contact plates 35 instead of the bridge 22. The contact plates 35 differ from the contact plates 29 in that a pair of arm-side holes 34 are defined near the respective ends of the contact plate 35 instead of single arm-side hole 34 at each of the respective ends. The support line 42 may be fixed in the contact plate 35 by forming a very small knot 31 in the support line 42, an interference fit, an adhesive, or other suitable method. In this alternative embodiment, one of the holes in each pair of bridge-side holes 30 becomes redundant. Preferably, only a single hole 30 is defined in each of the upper and lower portions of the bridge plate 28. FIG. 13 illustrates a contact plate 35 with end piece 26 and sidearm 36 attached. Contact plate 35 may be integrally formed with end piece 26. During assembly of the spectacle apparatus of this alternative embodiment, the support line 42 is received in arm-side holes 34 as shown (FIG. 13). The support line 42 is then tensioned to a desired line tension and fixed using a selected fixation method on the lens-side of contact plate 35 (fixation using a knot 31 is shown). Any excess support line may then be cut away. The line tension may vary but must be at least sufficient to support the lenses 24 within the spectacle apparatus. The end piece 26 may be attached to the contact plate 35 at its centre near the projection 32, or nearer the top or bottom of the contact plate 35 as desired so long as the end piece 26 does not interfere with the support line 42.

Figure 14:
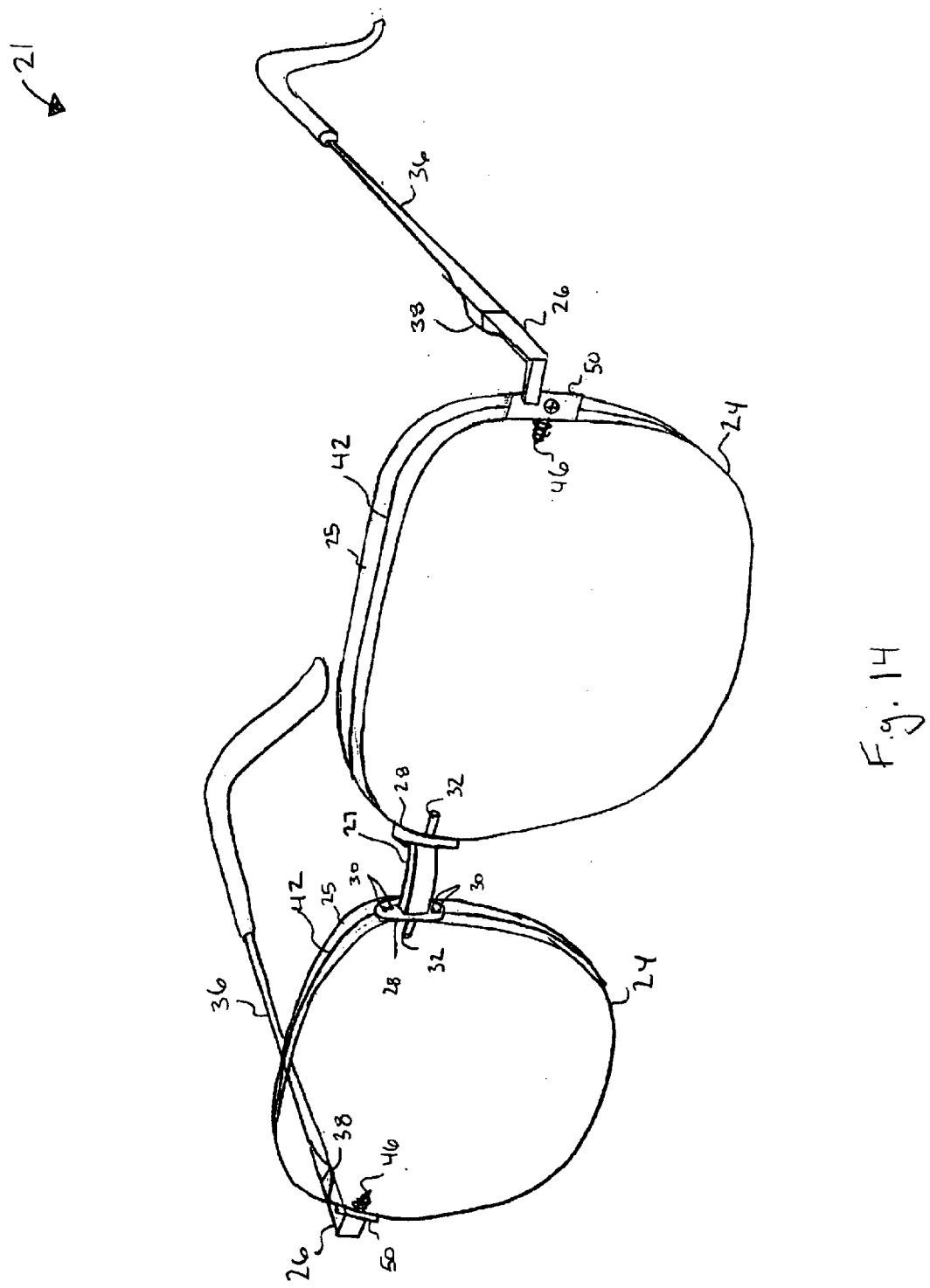
FIG. 14 is a perspective view of a second embodiment of a spectacle apparatus according to the present invention.

Referring now to FIG. 14, a spectacle apparatus in accordance with a second embodiment of the present invention is indicated generally at 21. The spectacle apparatus 21 is substantially similar to apparatus 20, except that the contact plates 50 have a different configuration than the contact plates 29. Instead of using integral projections 32 in the contact plates, the spectacle apparatus 21 could use screws 46. Typically, the screw length is 3.5 mm but smaller or larger screws may be used. Screws 46 can be secured in the blind holes 44 in several ways, including forming a thread in the blind hole 44 or inserting a threaded member into the blind hole 44 adapted to receive screw 46, for example, a nut 48 or tubular member made of plastic or paper having internal threads defined therein.

Figure 15A:
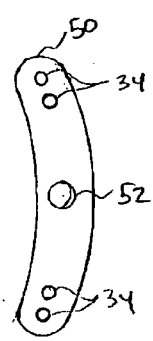
FIG. 15A is a perspective view of an end piece in the spectacle apparatus of FIG. 14.
Figure 15B:
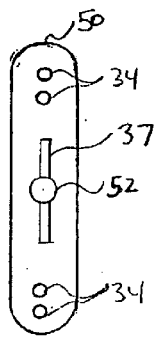
FIG. 15B is a rear view of the end piece of FIG. 15A.
Figure 15C:
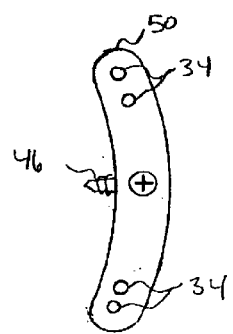
FIG. 15C is an alternate perspective view of the end piece of FIG. 15A showing the rear side of the end piece.

Referring now to FIGS. 15A to 15C, a contact plate 50 will be described in more detail. Preferably, the contact plate 50 is elongate with a width of 2 mm and a length of 8.5 mm. Other shapes and dimensions of the contact plate 50 may be used if desired. Screw hole 52 is located at or near the centre of the contact plate 50. If desired, the screw hole 52 may be located off centre. The screw hole 52 must be large enough to receive and hold screw 46 (FIG. 15C). Arm-side holes 34 are located near the respective ends of the contact plate 50.

Figure 16B:
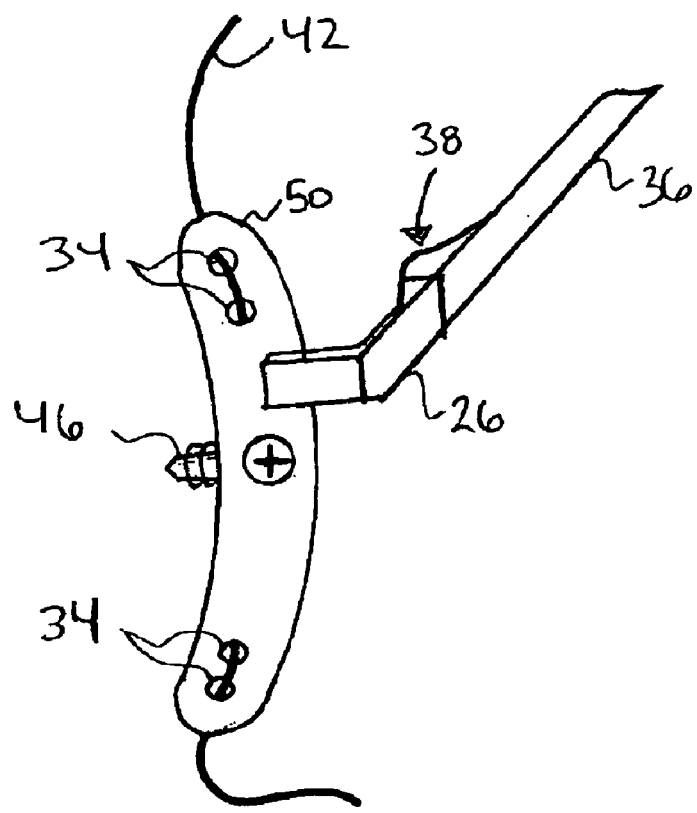
FIG. 16B is a perspective view of the end piece of FIG. 16A with a support line received therein and fixed using a knot.
Figure 16A:
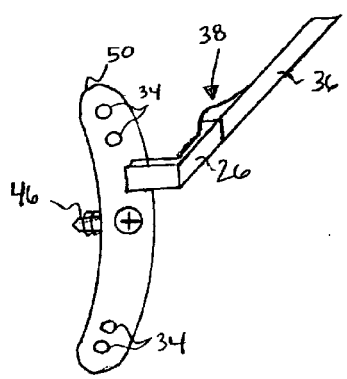
FIG. 16A is a perspective view of the end piece of FIG. 15C having a sidearm attached.

FIGS. 16A and 16B illustrate a contact plate 50 with end piece 26 and sidearm 36 attached. Contact plate 50 may be integrally formed with end piece 26. During assembly of the spectacle apparatus 21, the support line 42 is received in holes 34 and is held tightly in the shown position on the contact plate 50 by line tension (FIG. 16B). The end piece 26 may be attached to contact plate 50 above or below screw hole 52 or as desired so long as the end piece 26 does not interfere with or hinder the operation of screw 46.

Figure 17A:
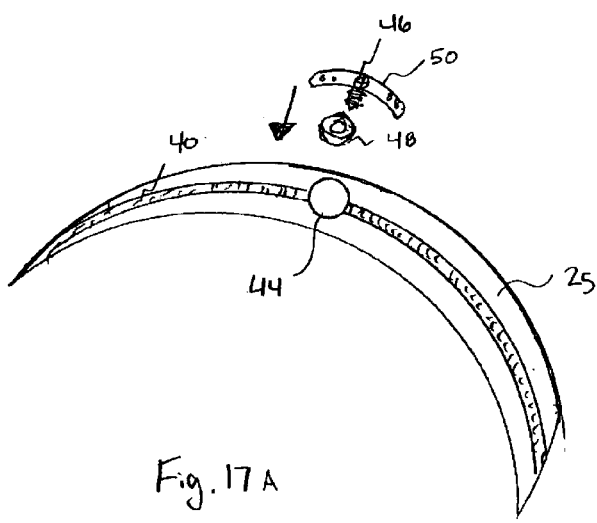
FIG. 17A is a perspective view of the lens of FIG. 11 showing a nut and the end piece of FIG. 15C positioned to be received in a blind hole in the lens of FIG. 14.
Figure 17B:
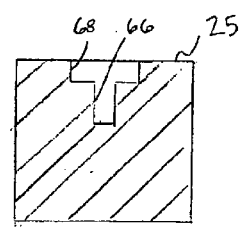
FIG. 17B is a partial side view of a two-channel blind hole in the lens of FIG. 11 formed perpendicular to the edge surface.

Referring now to FIGS. 17A and 17B, one method of attachment of the contact plate 50 to the lens 24 will be described. Following the fitting of the support line 42 in the contact plate 50, nut 48 is inserted into blind hole 44.

Preferably, the outer surface of nut 48 is flush with edge surface 25. The dimensions of the blind hole 44 must be large enough to accommodate the diameter of nut 48 and the length of screw 46. The lens 24 may define blind holes having two concentric channels of differing diameter. A first inner channel 66 is adapted to receive any portion of screw 46 extending beyond the lower surface of nut 48 (see FIG. 17B). A second channel 68 is adapted to receive nut 48, and has a larger diameter than the first channel 66 but is not as deep. After nut 48 is inserted into blind hole 44, the contact plate 50 is secured to the lens 24 by driving the screw 46 into nut 48 until the contact plate 50 is securely fit. Care must be taken in driving the screw 46 to avoid damaging the lens 24.

Figure 18:
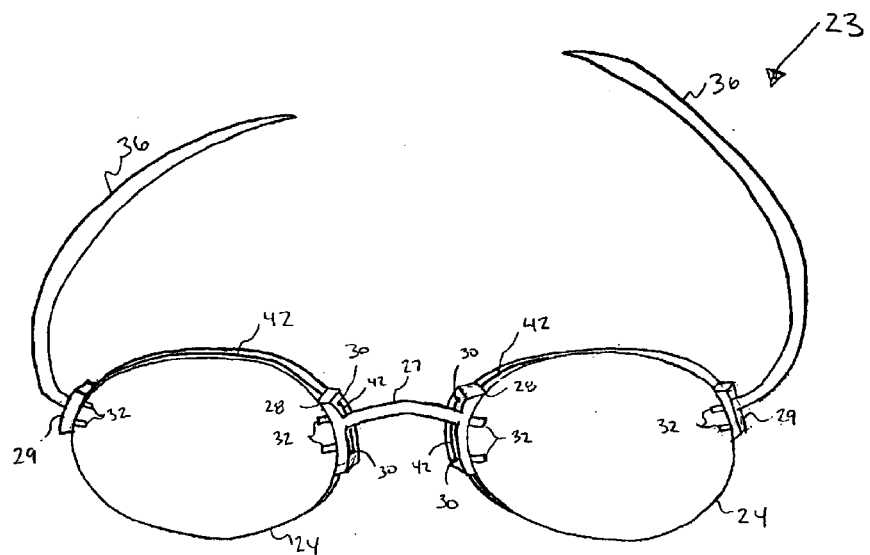
FIG. 18 is a perspective view of a third embodiment of a spectacle apparatus according to the present invention.
Figures 19A, 19B:
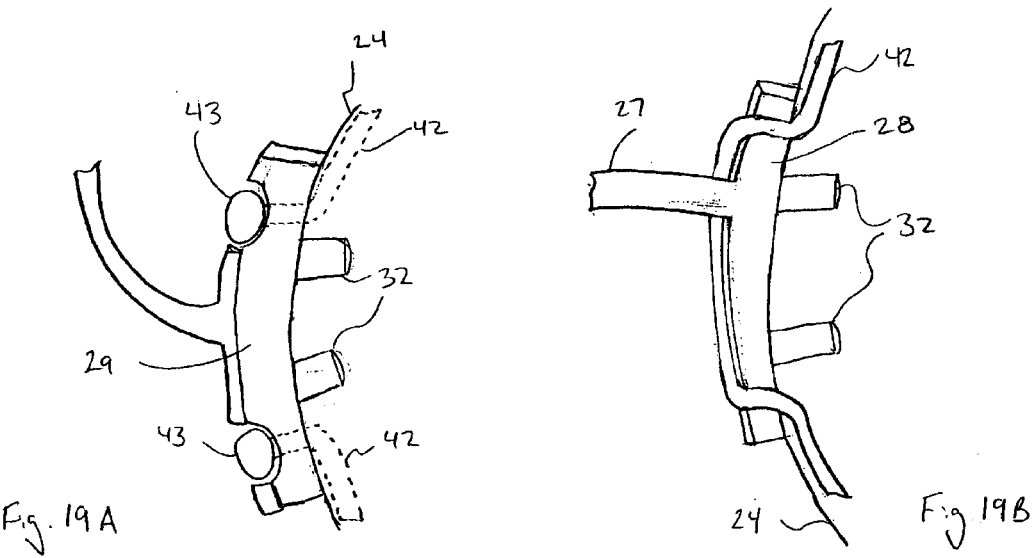
FIG. 19A is an enlarged partial perspective view of an end piece of the spectacle apparatus of FIG. 18.
FIG. 19B is an enlarged partial perspective view of the bridge of the spectacle apparatus of FIG. 18.

Referring now to FIGS. 18 to 19B, a spectacle apparatus in accordance with a third embodiment of the present invention is indicated generally at 23. The spectacle apparatus 23 is substantially similar to apparatus 20, except that the contact plates and bridge plates have two projections 32 attached thereto instead of one. The projections 32 may be integrally formed with the bridge plates 28 and contact plates 29. In this embodiment, the support line 42 is secured in the spectacle apparatus 23 at the contact plates 29 using an interference fit. The lens 24 may also be fixed by forming a very small knot 31 in the support line 42, an adhesive, or other suitable method, or may be fixed at the bridge plates 28.

FIG. 19A illustrates the end piece of the spectacle apparatus 23 with the support line 42 fixed by interference fit. FIG. 19B illustrates the bridge plate 28 of the spectacle apparatus 23 with the support line 42 received therein. During the fixation of a support line 42, bulb 43 is temporarily deformed and support line 42 is fitted in the contact plate 29 as described above. While the support line 42 is maintained at the desired line tension, the bulb 43 reestablishes, by plastic memory, its original diameter, thus securing lenses 24 within the spectacle apparatus 23 in an interference fit. The security of attachment may be increased by treating bulb 43 with glue or other fixative after assembly, or by treating bulb 43 to compression forces which are great enough to permanently deform bulb 43, partially spreading it against the arm-side surface of contact plate 29 immediately around hole 34.

Some of the possible variations of the spectacle apparatus described above will now be described. The material of construction of the structural components may vary, but is typically metal or plastic. If desired, auxiliary members may be inserted through holes cut in the surface of lenses 24 to more securely fix the projections 32. If desired, the spectacle apparatus can be constructed without sidearms or end pieces, the apparatus being supported, for example, by nose pieces attached to the spectacle apparatus resting or gripping the bridge of the nose of the eyeglass wearer. In some applications, the spectacle apparatus may be constructed without contact plates, the apparatus being supported on the eyeglass wearer by other means such as the nose pieces.

Although the present invention has been described with reference to illustrative embodiments, it is to be understood that the invention is not limited to these precise embodiments, and that various changes and modifications may be effected therein by one skilled in the art. All such changes and modifications are intention to be encompassed in the appended claims.

What is claimed is:

1. An apparatus for holding a spectacle lens, comprising:
   an elongate bridge defining a bridge-side hole at each end, said elongate bridge having a first projection at each end, each said first projection being adapted for insertion in a blind hole in the edge surface of said spectacle lens; and
   a support line inserted in a groove formed in the edge surface of said spectacle lens and received in at least one said bridge-side hole.

2. An apparatus for holding a spectacle lens, comprising:
   an elongate bridge having a first and second end, and defining a bridge-side hole in each of the first and second ends;
   a first fixing member attached to said elongate bridge, said first fixing member being adapted for insertion to a blind hole in the edge surface of said spectacle lens;
   a support line inserted in a groove formed in the edge surface of said spectacle lens and received in at least one said bridge-side hole.

3. The apparatus as claimed in claim 2, further comprising a second fixing member attached to said elongate bridge, said first fixing member being adapted for insertion to a blind hole in the edge surface of said spectacle lens, wherein said first fixing member is attached to the first end of said elongate bridge, and said second fixing member is attached to the second end of said elongate bridge.

4. The apparatus of claim 3, wherein said first and second fixing members comprise a first projection.

5. The apparatus as claimed in claim 4, further comprising first and second contact plates, each said contact plate defining hole adapted for receiving said support line, each said contact plate having a second projection adapted for insertion in a blind hole in the edge surface of each said spectacle lens.

6. The apparatus as claimed in claim 5, further comprising groove plates attached to the first and second ends of said elongate bridge, each said groove plate being adapted for insertion in the groove formed in the edge surface of said spectacle lens.

7. The apparatus as claimed in claim 6, further comprising groove plates attached to said one side of said first and second contact plates, each said groove plate being adapted for insertion in the groove formed in the edge surface of said spectacle lens.

8. The apparatus of claim 3, wherein said first and second fixing members further comprise a groove plate, each said groove plate being adapted for insertion in the groove formed in the edge surface of said spectacle lens.

9. A spectacle apparatus, comprising:
   a first and second lens each having an edge surface, each said lens defining a groove in said edge surface;
   an elongate bridge defining a bridge-side hole at each end, said elongate bridge having a first projection at each end, each said first projection being adapted for insertion in a blind hole in the edge surface of one of said lenses;
   a first and second contact plate, each said contact plate defining an arm-side hole adapted for receiving a support line, each said contact plate having a second projection at one side, each said second projection being adapted for insertion in a blind hole in the edge surface of one of said lenses; and
   a support line inserted in said groove of at least one said spectacle lens and received in at least one said bridge-side hole and at least one said arm-side hole.

10. The apparatus as claimed in claim 9, further comprising groove plates attached to each end of said elongate bridge, each said groove plate being adapted for insertion in the groove formed in the edge surface of said spectacle lens.

11. The apparatus as claimed in claim 10, further comprising groove plates attached to said first and second contact plates, each said groove plate being adapted for insertion in the groove formed in the edge surface of said spectacle lens.

12. The apparatus as claimed in claim 9, wherein said support line is fixed in at least one of said bridge-side holes.

13. The apparatus as claimed in claim 9, wherein each said contact plate is integrally formed with an end piece.

14. The apparatus as claimed in claim 9, wherein said support line is a thin flexible metal wire.

15. The apparatus as claimed in claim 9, wherein said support line is a comprised of polymer fiber.

16. The apparatus as claimed in claim 9, wherein said support line is a fishing line.

17. The apparatus as claimed in claim 9, wherein said support line is fixed using a knot formed by said support line.

18. The apparatus as claimed in claim 9, wherein said support line is fixed using an interference fit.

19. The apparatus as claimed in claim 9, wherein said support line is fixed using an adhesive.

20. The apparatus as claimed in claim 9, wherein said first projection has a diameter of about 1 mm and a length of about 1 mm.

21. The apparatus as claimed in claim 9, wherein said second projection is a screw.

22. A method for holding a spectacle lens in a spectacle apparatus, said spectacle apparatus including an elongate bridge defining a bridge-side hole at each end, said elongate bridge having a first projection at each end, said method comprising the steps of:

inserting said first projection into a blind hole formed in the edge surface of said spectacle lens;

inserting a support line in at least one said bridge-side hole; and inserting said support line in a groove formed in the edge surface of said spectacle lens.

23. The method of as claimed in claim 22, wherein said spectacle apparatus includes groove plates attached to each end of said elongate bridge, said method further comprising the step of:

inserting said groove plate in the groove formed in the edge surface of said spectacle lens.

24. The method as claimed in claim 22, said spectacle apparatus further including a contact plate defining an arm-side hole and having a second projection attached to one side, said method further comprising the step of:

inserting said support line in said arm-side hole.

25. The method as claimed in claim 24, wherein said spectacle apparatus further includes a groove plate attached to the contact plate, said method further comprising the step of:

inserting said groove plate in the groove formed in the edge surface of said spectacle lens.

26. The method as claimed in claim 22, further comprising the step of fixing said support line in at least one said bridge-side hole.

27. The method as claimed in claim 22, further comprising the step of fixing said support line in said arm-side hole.

* * * * *